United States Patent
Takeda et al.

(10) Patent No.: US 10,023,476 B2
(45) Date of Patent: Jul. 17, 2018

(54) WATER FILTER CARTRIDGE AND WATER PURIFIER

(71) Applicants: Mitsubishi Rayon Co., Ltd., Tokyo (JP); Kuraray Chemical Co., Ltd., Okayama (JP)

(72) Inventors: Hatsumi Takeda, Toyohashi (JP); Masanori Itakura, Tokyo (JP); Masanori Ito, Aichi (JP); Hiroe Yoshinobu, Bizen (JP)

(73) Assignees: Mitsubishi Chemical Corporation, Tokyo (JP); Kuraray Co., Ltd., Okayama (JP)

(*) Notice: Subject to any disclaimer, the term of this patent is extended or adjusted under 35 U.S.C. 154(b) by 55 days.

(21) Appl. No.: 15/316,260

(22) PCT Filed: Jun. 5, 2015

(86) PCT No.: PCT/JP2015/066381
§ 371 (c)(1),
(2) Date: Dec. 5, 2016

(87) PCT Pub. No.: WO2015/186831
PCT Pub. Date: Dec. 10, 2015

(65) Prior Publication Data
US 2017/0144896 A1    May 25, 2017

(30) Foreign Application Priority Data
Jun. 6, 2014   (JP) .................................. 2014-117882

(51) Int. Cl.
C02F 1/28    (2006.01)
B01D 63/02   (2006.01)
(Continued)

(52) U.S. Cl.
CPC .............. *C02F 1/283* (2013.01); *B01D 63/02* (2013.01); *C02F 1/44* (2013.01); *B01D 2313/40* (2013.01);
(Continued)

(58) Field of Classification Search
CPC ............ B01D 2313/40; B01D 2313/44; B01D 63/02; C02F 1/283; C02F 1/44; C02F 2101/36; C02F 2201/006; C02F 2307/04
See application file for complete search history.

(56) References Cited

FOREIGN PATENT DOCUMENTS

JP    10-277539 A    10/1998
JP    2001-205253 A   7/2001
(Continued)

OTHER PUBLICATIONS

International Search Report dated Aug. 25, 2015 for corresponding International Patent Application No. PCT/JP2015/066381.

*Primary Examiner* — Dirk Bass
(74) *Attorney, Agent, or Firm* — Morgan, Lewis & Bockius LLP

(57) ABSTRACT

A water filter cartridge is reduced in fluctuation in filtration flow rate or in filtration performance due to activated carbon, and can exhibit stable performance even at the time of large scale production; and a water purifier is equipped with the water filter cartridge. A water filter cartridge having particulate activated carbon filled in a case for accommodating a filtering material in which the ratio of the total mass of particulate activated carbon having a particle size of 0.3 to 4.0 mm relative to the total mass of activated carbon is 97% by mass or more, and, in a particle size distribution which represents the relationship of the mass ratio of activated carbon relative to the particle size of activated carbon, a peak at which the mass ratio is 31% by mass or more does not appear in a particle size range of from 0.3 to 4.0 mm.

9 Claims, 6 Drawing Sheets

(51) Int. Cl.
*C02F 1/44* (2006.01)
*C02F 101/36* (2006.01)
(52) U.S. Cl.
CPC ...... *B01D 2313/44* (2013.01); *C02F 2101/36* (2013.01); *C02F 2201/006* (2013.01); *C02F 2307/04* (2013.01)

(56) References Cited

FOREIGN PATENT DOCUMENTS

| | | |
|---|---|---|
| JP | 2001-239253 A | 9/2001 |
| JP | 2004-230335 A | 8/2004 |

WATER FILTER CARTRIDGE AND WATER PURIFIER

TECHNICAL FIELD

The present invention relates to a water filter cartridge and a water purifier.

This application claims priority to Japanese Patent Application No. 2014-117882 which has been filed in Japan on Jun. 6, 2014, and the content of which is incorporated herein by reference.

BACKGROUND ART

There is known, for example, a pitcher type water purifier which is generally used at home, is capable of purifying raw water up to 1 to 2 liter at one time, and can be kept in a refrigerator or the like as it is. As a pitcher type water purifier, there is a water purifier including an outer container, an inner container which is formed to be detachable from the outer container and to divide the inside of the outer container to a upper part and a lower part, and a water filter cartridge formed inside the inner container, for example. According to the pitcher type water purifier, a region of the outer container that is below the inner container is a purified water reservoir, and a region of the outer container that is above the inner container is a raw water reservoir.

When raw water is added to a raw water reservoir of the pitcher type water purifier, the raw water slowly passes through the water filter cartridge to be purified by virtue of its own weight, and then flows into the purified water reservoir.

As a water filter cartridge, a cartridge having activated carbon or a hollow fiber membrane bundle as a filtering material is known. For example, mention can be made of a water filter cartridge in which a hollow fiber membrane bundle is fixed on a bottom part in an approximately cylinder shape case to accommodate a filtering material and activated carbon is filled on the hollow fiber membrane bundle without being mediated by a partition member (Patent Literature 1).

According to the water filter cartridge, raw water is filtered by a hollow fiber membrane only after being in contact with activated carbon. As such, even when there are proliferating microbes in the active carbon layer, the microbes are not incorporated in purified water. Furthermore, due to the absence of a partition member, filtration flow rate is high and raw water can be purified smoothly.

CITATION LIST

Patent Literature

Patent Literature 1: JP 2004-230335 A

SUMMARY OF THE INVENTION

Problem to be Solved by the Invention

However, the conventional water filter cartridge with activated carbon has problems that a fluctuation occurs in filtration flow rate or filtration performance (purification performance) as caused by activated carbon. For example, due to the fluctuation in the amount of activated carbon in each lot in the case of large scale production, there can be a case in which, as the filtration flow rate is increased at the time of having a reduced amount of activated carbon, the filtration performance (purification performance) is deteriorated. Furthermore, there can be also a case in which, when crushed carbon is used, the filtration flow rate or filtration performance is deteriorated due to the shape of the activated carbon even when the particle size has been established by a sieve.

An object of the present invention is to provide a water filter cartridge which is reduced in fluctuation in filtration flow rate or in filtration performance due to activated carbon, and which can exhibit stable performance even at the time of large scale production; and a water purifier which is equipped with the water filter cartridge.

Means for Solving Problem

The present invention includes the following constitutions.

[1] A water filter cartridge having particulate activated carbon filled in a case for accommodating a filtering material in which the ratio of the total mass of particulate activated carbon having a particle size of 0.3 to 4.0 mm relative to the total mass of activated carbon is 97% by mass or more, and, in a particle size distribution which represents the relationship of the mass ratio of activated carbon relative to the particle size of activated carbon, a peak at which the mass ratio is 31% by mass or more does not appear in a particle size range of from 0.3 to 4.0 mm.

[2] The water filter cartridge described in [1], in which the activated carbon is activated carbon which has at least one peak in each of a region with particle diameter of 0.3 mm or more and less than 0.71 mm and a region with particle diameter of 0.71 mm or more and 4.0 mm or less in the particle size distribution.

[3] The water filter cartridge described in [2], in which the activated carbon is activated carbon which has one peak in each of a region with particle diameter of 0.3 mm or more and less than 0.71 mm and a region with particle diameter of 0.71 mm or more and 4.0 mm or less in the particle size distribution.

[4] The water filter cartridge described in any one of [1] to [3], being a water filter cartridge for gravity filtration.

[5] The water filter cartridge described in any one of [1] to [4], in which a hollow fiber membrane bundle is further filled as a filtering material and the activated carbon is filled on top of the hollow fiber membrane bundle.

[6] The water filter cartridge described in [5], in which the activated carbon is filled on top of the hollow fiber membrane bundle without being mediated by a partition member.

[7] The water filter cartridge described in any one of [1] to [6], in which, when the activated carbon is filled on top of the hollow fiber membrane and water containing chloroform at concentration of 60 ppb is allowed to flow so as to have predetermined space velocity (SV) $[\mathrm{hr}^{-1}]$ based on JIS S3201, and then chloroform filtration performance [L/mL] is measured by having the point of 80% chloroform removal as a break point, the space velocity (SV) is plotted against x axis and the chloroform filtration performance is plotted against y axis, and linear approximation is made (y=ax+b), slope a of the straight line is −0.03 to 0.

[8] The water filter cartridge described in any one of [1] to [7], in which, when the activated carbon is filled to a predetermined stack height and filtration flow rate is measured based on JIS S3201, and then the stack height [mm] of the activated carbon is plotted against x axis and the filtration flow rate [L/minute] is plotted against y axis, and linear approximation is made (y=cx+d), slope c of the straight line is −25 to 0.

[9] A water purifier equipped with the water filter cartridge described in any one of [1] to [8].

Effect of the Invention

The water filter cartridge of the present invention is reduced in fluctuation in filtration flow rate and in filtration performance by activated carbon, and the water filter cartridge has stable performance even in the case of large scale production. Furthermore, as the water purifier of the present invention is equipped with a water filter cartridge which is reduced in fluctuation in filtration flow rate or in filtration performance by activated carbon, the water purifier has stable performance even in the case of large scale production.

MODE(S) FOR CARRYING OUT THE INVENTION

[Water Filter Cartridge]

Hereinbelow, an example of a water filter cartridge of the present invention is described on the basis of FIG. 1, FIG. 2A, and FIG. 2B.

Figure 1:
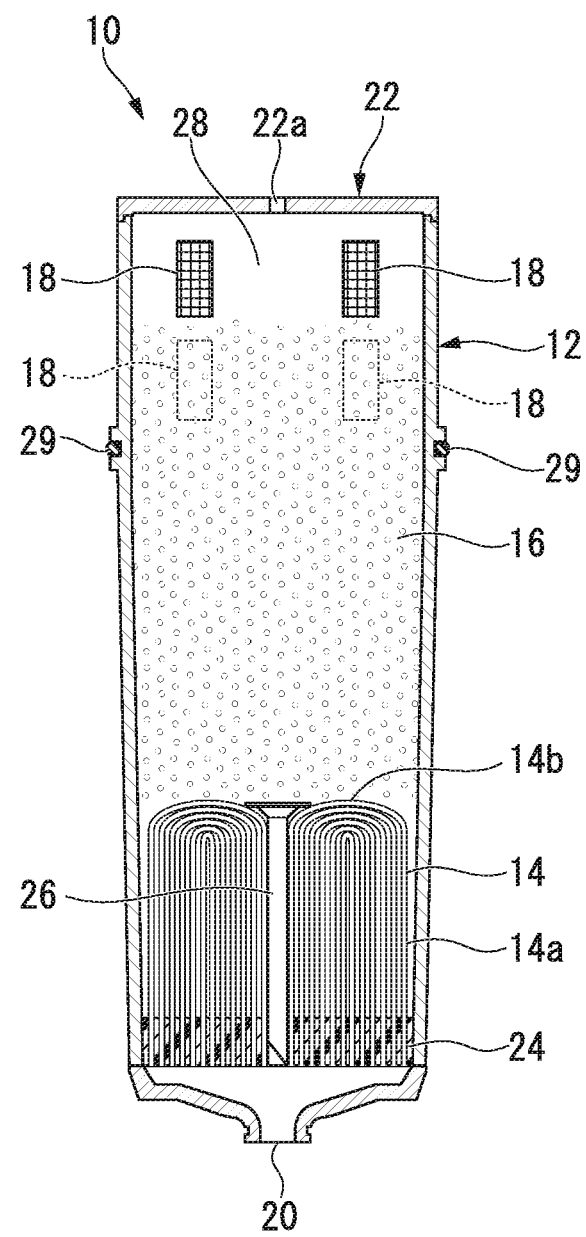
FIG. 1 is a cross-sectional view illustrating an example of a water filter cartridge of the present invention.

A water filter cartridge 10 of an embodiment has, as a water filter cartridge for gravity filtration, a case 12 with approximately circumferential shape to accommodate a filtering material inside the case, and a hollow fiber membrane bundle 14 and an activated carbon 16 are filled in the inside of the cartridge as illustrated in FIG. 1.

On the upper part of the case 12, an opening is provided and the opening is closed by a cover 22. At the center of the cover 22, an air discharge hole 22a for communication between the inside and outside of the water filter cartridge 10 is formed. Furthermore, on an outer periphery of the case 12, an O ring 29 for tight fastening to a partition part of a water purifier which will be described later is provided in a circumferential direction.

In the peripheral wall part of the case 12, two columns (that is, top column and bottom column) of an inlet 18 for introducing raw water are provided in the upper region, and an outlet 20 for discharging purified water is provided in the lower region. The inlet 18 of the water filter cartridge 10 is equipped with a net structure to remove impurities or the like in water.

At the bottom part in the case 12 of the water filter cartridge 10, the hollow fiber membrane bundle 14 is fixed by a fixing resin 24, and the activated carbon 16 is filled on top of the membrane bundle. In the present example, the activated carbon 16 is filled on the hollow fiber membrane bundle 14 without being mediated by a partition member.

In the water filter cartridge 10, the activated carbon 16 is filled to the height which is close to the distance between the inlet 18 at the top side and the inlet 18 of the bottom side, and above the filled activated carbon 16, an air accumulation part 28 is formed. The design is made such that, according to an interaction between the air accumulation part 28 and the air discharge hole 22a formed at the center of the cover 22, raw water is more smoothly introduced from the inlet 18 to the inside of the water filter cartridge 10.

According to the water filter cartridge 10, when raw water is introduced from the inlet 18 to the inside of the case 12, the raw water is subjected to gravity filtration by the activated carbon 16 and the hollow fiber membrane bundle 14, and purified water is discharged from the outlet 20. Residual chlorine or mold odor, organic compounds like trihalomethane, or the like in water are adsorbed by the activated carbon 16, and removed. Furthermore, microbes or fine particles are filtered by the hollow fiber membrane bundle 14, and removed.

(Activated Carbon)

The activated carbon 16 is an aggregate of particulate activated carbon.

Examples of the type of the particulate activated carbon include those obtained by carbonizing plant-matter (such as wood, cellulose, sawdust, wood charcoal, coconut husk charcoal, or charcoal powder), coal-matter (such as peat, lignite, brown coal, bituminous coal, anthracite, or tar), petroleum-matter (such as petroleum residuals, sulfuric acid sludge, or oil carbon), pulp waste water, synthetic resin, and the like. As for the activated carbon 16, according to the necessity, those subjected to gas activation (water vapor, carbon dioxide, air or the like) or chemical activation (calcium chloride, magnesium chloride, zinc chloride, phosphoric acid, sulfuric acid, caustic soda, potassium hydroxide, or the like) can be also used.

It is preferable that the particulate activated carbon is adhered with silver or mixed with silver. Accordingly, proliferation of microbes on the activated carbon 16 is easily suppressed.

The ratio of the total mass of the particulate activated carbon with particle size of 0.3 to 4.0 mm relative to the total mass of the activated carbon 16 is 97% by mass or more, and it is more preferably 98% by mass or more. As the ratio is the same or greater than the lower limit, sufficient filtration flow rate and favorable filtration performance are obtained. The upper limit of the above ratio is 100% by mass.

The activated carbon 16 is characterized in that, in a particle size distribution which represents the relationship of the mass ratio relative to the particle size, a peak at which the mass ratio is 31% by mass or more does not appear in a particle size range of from 0.3 to 4.0 mm. As the activated carbon 16 has such particle size distribution, even when the amount of the activated carbon 16 filled inside the case 12 of the water filter cartridge 10 varies, a fluctuation in the filtration flow rate or filtration performance is small. As a result, even if there is a fluctuation in the amount of activated carbon in each lot in the case of large scale production, a water filter cartridge with sufficient filtration flow rate and favorable filtration performance can be stably produced.

Furthermore, like the present example, if the activated carbon is filled on the hollow fiber membrane bundle without being mediated by a partition member, there can be a case in which activated carbon with small particle size is inserted to a space in the hollow fiber membrane during use to cause a change in the particle size distribution of the activated carbon on the hollow fiber membrane bundle or a change in the stack height of the activated carbon, thereby yielding a fluctuation in the filtration flow rate or filtration performance. However, in the case of the activated carbon with broad particle size distribution in which a peak at which the mass ratio of 31% by mass or more does not appear in a particle size range of from 0.3 to 4.0 mm, the change in the particle size distribution is small even when the activated carbon with small particle size falls in a space of the hollow fiber membrane, so that a fluctuation in the filtration flow rate or filtration performance is suppressed at low level. A fluctuation in the filtration flow rate or filtration performance caused by a change in the stack height can be also suppressed at low level. Furthermore, in the case of filling the activated carbon on the hollow fiber membrane without being mediated by a partition member, the stack height indicates the height from the bottom part to the top part of the activated carbon filled on the hollow fiber membrane. In a case in which the partition member is present or a filtering material is not provided at the downstream, it indicates the height from the bottom part to the top part of the filled activated carbon.

According to the present invention, it is preferable that, in a particle size distribution which represents the relationship of the mass ratio relative to the particle size, a peak at which the mass ratio is 30% by mass or more does not appear in a particle size range of from 0.3 to 4.0 mm. It is more preferable that a peak at which the mass ratio is 28% by mass or more does not appear. Accordingly, a fluctuation in the filtration flow rate or filtration performance caused by a change in the amount of activated carbon becomes even smaller.

Regarding the particle size distribution which represents the relationship of the mass ratio relative to the particle size of the activated carbon 16, number of the peak may be either 1, 2, or 3 or more.

As for the activated carbon 16, it is preferable to have activated carbon which has at least one peak in each of a region with particle diameter of 0.3 mm or more and less than 0.71 mm and a region with particle diameter of 0.71 mm or more and 4.0 mm or less in the particle size distribution. Accordingly, it becomes easier to have the effect of suppressing the fluctuation in the filtration flow rate or filtration performance caused by a change in the filling amount of activated carbon 16 to a low level. Furthermore, from the viewpoint of obtaining more easily the above effect, regarding the peaks in a region with particle diameter of 0.3 mm or more and less than 0.71 mm and in a region with particle diameter of 0.71 mm or more and 4.0 mm or less, the highest peak in each region is preferably present near the center part of the corresponding region.

Furthermore, as for the activated carbon 16, it is preferable to have activated carbon which has one peak in each of a region with particle diameter of 0.3 mm or more and less than 0.71 mm and a region with particle diameter of 0.71 mm or more and 4.0 mm or less in the particle size distribution. Accordingly, it becomes easier to have the effect of suppressing the fluctuation in the filtration flow rate or filtration performance caused by a change in the filling amount of activated carbon 16 to a low level. Furthermore, from the viewpoint of obtaining more easily the above effect, the peak in a region with particle diameter of 0.3 mm or more and less than 0.71 mm and the peak in a region with particle diameter of 0.71 mm or more and 4.0 mm or less are preferably present near the center part of the each region.

The particle size distribution of activated carbon is obtained by the following method based on JIS K1474.

Size classification is performed by using a sieve of 4.7 mesh (sieve opening of 4.0 mm), 10 mesh (sieve opening of 1.7 mm), 14 mesh (sieve opening of 1.18 mm), 18 mesh (sieve opening of 0.85 mm), 22 mesh (sieve opening of 0.71 mm), 26 mesh (sieve opening of 0.6 mm), 30 mesh (sieve opening of 0.5 mm), 36 mesh (sieve opening of 0.425 mm), or 42 mesh (sieve opening of 0.355 mm) in the order of gradual decrease in opening size of a sieve. Total mass of the activated carbon remained on the sieves with 10 mesh, 14 mesh, 18 mesh, 22 mesh, 26 mesh, 30 mesh, 36 mesh, or 42 mesh and on a holder is set at 100% by mass, and the mass ratio of the activated carbon on each sieve is plotted against the particle size (mesh) to obtain particle size distribution. Furthermore, the sieve for use is not limited to those with above mesh. For example, if a sieve of 8.6 mesh (sieve opening of 2.0 mm) is used instead of a sieve of 4.7 mesh, it is possible to obtain more accurate particle size distribution.

Mass of the activated carbon to be filled in a case is preferably 10 to 200 g. As the mass of the activated carbon is within the range, the purification can be carried out appropriately.

(Hollow Fiber Membrane Bundle)

Figure 2A:
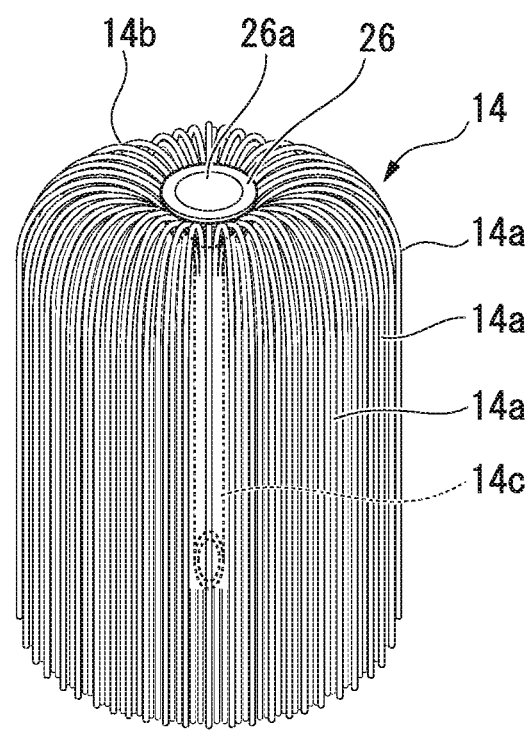
FIG. 2A is a perspective view illustrating the brief configuration of a hollow fiber membrane bundle of the water filter cartridge of FIG. 1.
Figure 2B:
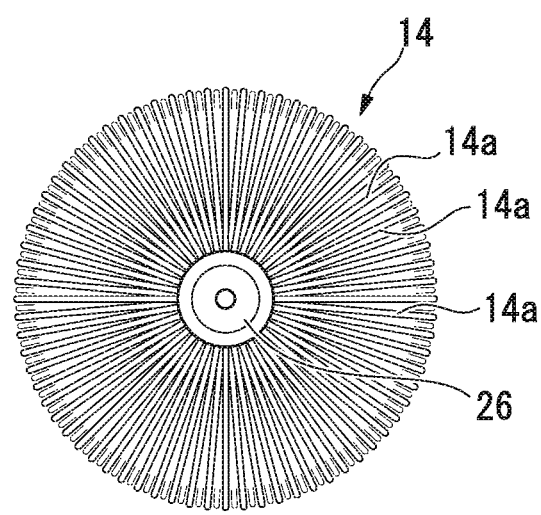
FIG. 2B is a plane view illustrating the brief configuration of the hollow fiber membrane bundle of the water filter cartridge of FIG. 1.

In the hollow fiber membrane bundle 14 of the present example, several hollow fiber membranes 14a are assembled as a bundle in approximately columnar shape (approximately cylinder shape) while they are bent in U shape as illustrated in FIG. 2A and FIG. 2B. Namely, as several hollow fiber membranes 14a can be bent in U shape from the center part (core part) of a plane, which is perpendicular to the axial direction of the case 12, toward an inner wall, the hollow fiber membranes 14a can be arranged in a radial shape from the center. As a result, the hollow fiber membrane bundle 14 with approximately columnar shape (approximately cylinder shape) is formed.

By using the hollow fiber membrane bundle 14 as described above, the filling efficiency of a hollow fiber membrane can be increased more so that the filtration performance can be enhanced more.

A bent part 14b of the hollow fiber membrane bundle 14 which is formed by bending the hollow fiber membrane 14a to have a U shape is facing toward the inlet 18 side of the case 12.

Each of the hollow fiber membrane 14a is fixed by the fixing resin 24 at the bottom part of the case 12. Namely, as the spaces between the hollow fiber membranes 14a at the bottom part of the case 12 are filled by the fixing resin 24, fixing is made so as not to allow a leak of liquid. Furthermore, while the hollow fiber membrane 14a is fixed by the fixing resin 24, the end part at the bottom side of the hollow fiber membrane 14a is remained open.

At the approximately center part of the hollow fiber membrane bundle 14, a void part 14c is formed along the central axis direction, and in the void part 14c, a center tube (tube) 26 is inserted.

As for the hollow fiber membrane 14a, those commonly used as a filtering material of a water filter cartridge can be used. Specifically, those with various materials like cellulose based, polyolefin based (polyethylene based), polyvinyl alcohol based, PMMA (polymethyl methacrylate) based, and polysulfone based can be used. In this embodiment, due to the reason of having excellent water permeability and easiness in production, in particular, a polysulfone based hollow fiber membrane is suitably used.

Furthermore, as the polyethylene based hollow fiber membrane having particularly high strength elongation can have high curvature with small bending radius r when it is bent in U shape, it is particularly efficient when high curvature is desired, for example. However, in this embodiment, as described above, the hollow fiber membrane 14a is bent in U shape from the center part of the case 12 toward an inner wall, and thus the curvature can be relatively small (bending radius r is relatively large). Accordingly, the polysulfone based hollow fiber membrane 14a having excellent water permeability or the like is preferable.

Pore diameter, porosity, membrane thickness, outer diameter and the like of the hollow fiber membrane 14a for forming the hollow fiber membrane bundle 14 are not particularly limited as long as they have a value allowing the use of the hollow fiber membrane 14a as a filtering membrane. However, it is preferable that, for example, the outer diameter is 20 to 4000 μm or so, the pore diameter is 0.01 to 1 μm or so, the porosity is 20 to 90% or so, and the membrane thickness is 5 to 300 μm or so.

The center tube 26 is a circular pipe shaped member, and on one end of the center tube 26, that is, on the bent part 14b side of the hollow fiber membrane bundle 14, a flange part 26a with a circle shape is formed. Length of the center tube 26 is almost the same as the height of the hollow fiber membrane bundle 14. Furthermore, the other end of the center tube 26, that is, the end opposite to the flange part 26a, is remained open. It is sufficient that the other end is opened, but it is preferable that surface inclination is formed at a predetermined acute angle relative to the axial line of the center tube 26, for example, at an angle of 30° to 70°.

As for the fixing resin 24, a resin commonly used for fixing a hollow fiber membrane can be used, and examples thereof include a fixing resin which consists of a urethane resin, an epoxy resin, a polyepoxy resin or the like.

The hollow fiber membrane bundle 14 can be produced by the following method, for example.

Several hollow fiber membranes 14a are assembled in a bundle around a core rod as a center, and, within a columnar body, they are bent to have different bending directions with no constant direction, that is, bending for having a U shape is made such that top part of each of the hollow fiber membranes 14a propagates in radial shape away from the core rod and runs along the inner wall surface of the columnar body, and then the hollow fiber membranes 14a are bind in such state. At that time, each of the hollow fiber membranes 14a is adjusted to approximately evenly propagate in radial shape in every direction (360°) by having the core rod as a center. After that, by extracting those several hollow fiber membranes 14a from the columnar body, the hollow fiber membrane bundle 14 is established. Accordingly, the hollow fiber membrane bundle 14 having the bent part 14b facing upward is formed.

Furthermore, either of before extraction or after extraction of several hollow fiber membranes 14a from the columnar body, the core rod is removed, and the center tube 26 is inserted to the formed void part 14c. After that, at the bottom part of the case 12, the hollow fiber membrane bundle 14 and the center tube 26 are fixed to the bottom part side (the outlet 20 side) by the fixing resin 24.

The filling density of the hollow fiber membrane bundle 14 is preferably 25 to 60%. By setting the filling density within the range, the pass-through rate of raw water in a water filter cartridge can be easily increased to the level at which it can be used as a pitcher type water purifier. Accordingly, it becomes also possible to purify a relatively large amount of raw water within a short time. In addition, the filling density of a hollow fiber membrane can be obtained by the method described in Patent Literature 1.

From the viewpoint of easily obtaining the effect of the present invention, the water filter cartridge of the present invention preferably has slope a of −0.03 to 0 in which the slope a is calculated by the following method.

(Method for Calculating Slope a)

Activated carbon is filled on top of the hollow fiber membrane, water containing chloroform at concentration of 60 ppb is allowed to flow so as to have predetermined space velocity (SV) [hr$^{-1}$] based on JIS S3201, and chloroform filtration performance [L/mL] per mL of activated carbon is measured by having the point of 80% chloroform removal as a break point. Space velocity (SV) is plotted against x axis and the chloroform filtration performance is plotted against y axis and, according to linear approximation (y=ax+b), the slope a of the straight line is obtained.

The slope a calculated by the calculation method described above is ideally 0. However, as it has a negative value in real cases, it may be also $-0.03 \leq a < 0$.

The upper limit of the slope a calculated by the above calculation method is more preferably −0.005.

Furthermore, the lower limit of the slope a calculated by the above calculation method is preferably −0.02 and more preferably −0.013.

From the viewpoint of obtaining easily the effect of the present invention, the water filter cartridge of the present invention preferably has slope c of −25 to 0 in which the slope c is calculated by the following method.

(Method for Calculating Slope c)

Activated carbon is filled to a predetermined stack height and filtration flow rate is measured based on JIS S3201. Stack height [mm] of the activated carbon is plotted against x axis and the filtration flow rate [L/minute] is plotted against y axis, and according to linear approximation (y=cx+d), the slope c of the straight line is obtained.

The slope c calculated by the calculation method described above is ideally 0. However, as it has a negative value in real cases, it may be also $-25 \leq c < 0$.

The upper limit of the slope c calculated by the above calculation method is more preferably −5 and even more preferably −10.

Furthermore, the lower limit of the slope c calculated by the above calculation method is more preferably −20.

According to the water filter cartridge of the present invention described above, activated carbon with specific particle size distribution is filled in the case so that the fluctuation in the filtration flow rate or filtration performance is low even when there is a change in the filling amount of activated carbon in the case of large scale production or the like. As such, it is easy to design the filtering material, and thus a water filter cartridge showing stable performance even in the case of a large scale production can be easily produced. The water filter cartridge of the present invention is particularly useful in that, for a case in which the activated carbon is filled on the hollow fiber membrane bundle without being mediated by a partition member, the fluctuation in the filtration flow rate or filtration performance is kept at low level even when a part of the activated carbon falls between the hollow fiber membranes. Furthermore, it is difficult to have a constant space between the hollow fiber membranes particularly when the hollow fiber membrane is bent in U shape such that it propagates away in radial shape and runs along the inner wall surface of the columnar body, in particular, and a water filter cartridge in which part of the activated carbon falls on the hollow fiber membrane and a water filter cartridge without having such fall are yielded, and thus a deviation occurs between the products. However, by filling the activated carbon as described in the present invention, it is possible to produce a water filter cartridge having stable filtration flow rate and filtration performance even in such case.

Furthermore, the water filter cartridge of the present invention is not limited to the water filter cartridge 10 described above. It may be a water filter cartridge which does not use a hollow fiber membrane, for example.

Furthermore, in the case of using a hollow fiber membrane bundle, shape of the hollow fiber membrane bundle is not limited to the shape of the hollow fiber membrane bundle 14 described above, and it may be a bundle shape in which the bundle is simply bent to have a U shape or a raschel knitted shape, for example.

Furthermore, the water filter cartridge of the present invention may be a water filter cartridge in which the activated carbon is filled on the hollow fiber membrane bundle as mediated by a partition member.

Furthermore, the water filter cartridge of the present invention is not limited to a cartridge for gravity filtration, and it may be a water filter cartridge which is attached to a water pipe or the like.

[Water Purifier]

The water purifier of the present invention may have, other than having the water filter cartridge of the present invention, publicly well known aspects. Hereinbelow, as an example of the water purifier of the present invention, a water purifier 1 equipped with the water filter cartridge 10 described above is described on the basis of FIG. 3 and FIG. 4.

The water purifier 1 is a pitcher water purifier of gravity filtration type (batch type).

Figure 3:
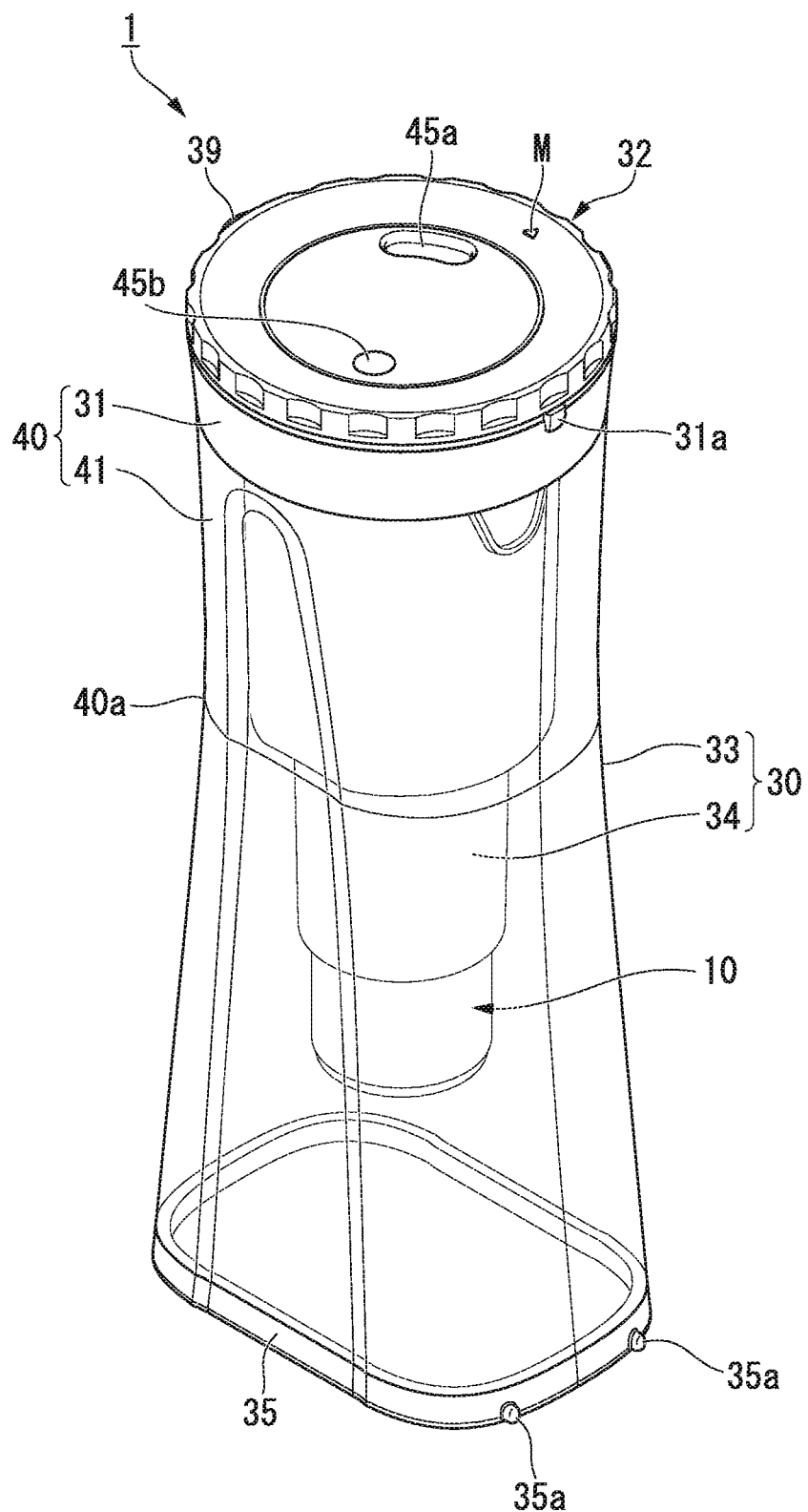
FIG. 3 is a perspective view illustrating a water purifier which is equipped with the water filter cartridge of FIG. 1.
Figure 4:
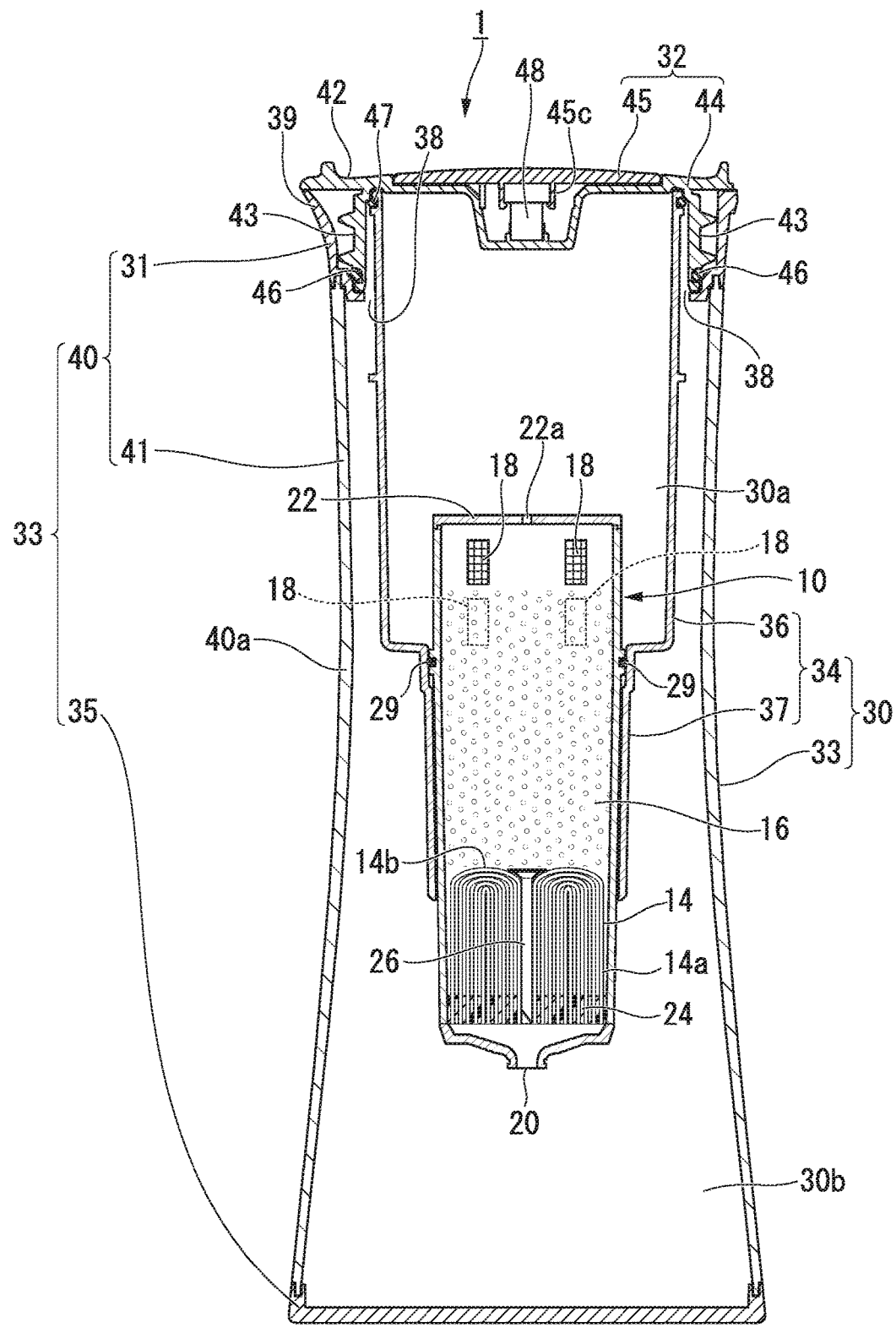
FIG. 4 shows a cross-sectional view of the water purifier of FIG. 3.

The water purifier 1 is equipped with, as illustrated in FIG. 3 and FIG. 4, a main pitcher body 30, a pitcher cover 32 to cover a top part 31 in which the main pitcher body 30 is open, and the water filter cartridge 10 which is provided in a detachable manner in the inside of the main pitcher body 30. The pitcher cover 32 can cover the top part 31 of the main pitcher body 30 not to allow a leak of liquid so that the water purifier 1 after purification of raw water can be horizontally placed in a refrigerator or the like.

The main pitcher body 30 is provided with the casing 33 and a partition part 34 which is formed in the casing 33 to divide the inside of the casing 33 in a longitudinal direction. The inside of the casing 33 is divided by the partition part 34 to two levels of a raw water reservoir 30*a* at upper side and a purified water reservoir 30*b* at bottom side.

The casing 33 has a cylinder shape of which one end is open and the other end is closed to form a bottom surface. The closed end (bottom part) becomes a bottom part 35 when the water purifier 1 is vertically placed.

From the open end (the top part 31) of the casing 33, raw water like tap water can be supplied to a raw water reservoir 30*a* and purified water stored in the purified water reservoir 30*b* can be discharged.

In the casing 33 of this example, a peripheral wall part 40 and the bottom part 35 are formed as a separate body. On a periphery of the top surface of the bottom part 35, grooves are formed such that, while the bottom end of the peripheral wall part 40 is inserted to the grooves, ultrasonic wave is radiated thereto by a ultrasonic generator so as to integrate the peripheral wall part 40 and the bottom part 35. Furthermore, in the peripheral wall part 40 of this example, the top part 31 and a part 41 other than the top part under the top part 31 are formed as a separate body, and they are melted by ultrasonic wave melting to yield an integrated body.

On one side among the four sides of the bottom part 35 of the casing 33, two foot parts 35*a* and 35*a* that are protruded in the lateral direction are formed, and also on the top part 31, one foot part 31*a* protruded in the lateral direction is formed. By forcing the foot part 31*a* and 35*a* to face downward, the water purifier 1 can be placed horizontally in a stable manner in a refrigerator or the like.

The partition part 34 consists of a cylinder body which has a large diameter part 36 and an attachment part 37 with a small diameter which is continuously formed in a downward direction from the large diameter part 36. The partition part 34 is provided in the inside of the casing 33 in a detachable manner according to fixing of a fixing bind part that is formed in a peripheral direction of the top periphery of the large diameter part 36 (not illustrated) and a fixing accommodation part that is formed in a peripheral direction of the inner periphery of the top part 31 of the casing 33 (not illustrated).

Furthermore, as the fixing accommodation part and the fixing bind part have a cut out part on the area which corresponds to each other, and according to a communication hole 38 formed on the cut out part, the top part 31 of the casing 33 can communicate with the purified water reservoir 30*b*. In addition, on an area which corresponds to the communication hole 38, the top part 31 of the casing 33 is protruded as a bump to the outside to form a purified water outlet 39 for discharging the purified water.

An attachment part 37 of the partition part 34 has a cylinder shape of which bottom part is remained open, and the water filter cartridge 10 is attached in a detachable manner to the attachment part 37. In the present example, as the O ring 29 is provided in the water filter cartridge 10, the water filter cartridge 10 is closely fastened in the attachment part 37.

The mode for detachably attaching the water filter cartridge 10 to the attachment part 37 of the partition part 34 is not particularly limited, and a mode may be employed in which a screw part with spiral shape is provided on the inner surface of the attachment part 37 of the partition part 34 to enable screw binding of the water filter cartridge 10. As another mode, for example, a mode may be mentioned in which a flange part protruding to the outside is formed on a body part of the water filter cartridge 10 and the flange part is fixed to the upper periphery of the attachment part 37 so that the water filter cartridge 10 is attached. To install such water filter cartridge 10, it is also possible to have a seal structure in which a groove part for fastening an O ring, a gasket or the like is provided in the attachment part 37 of the partition part 34, and the water filter cartridge 10 is tightly fastened by the O ring, gasket, or the like.

It is sufficient for the pitcher cover 32 to close the opening in the upper part of the main pitcher body 30. Preferably, by placing a packing or the like in the periphery thereof, the raw water reservoir 30*a* of the water purifier 1 can be sealed. Accordingly, when purified water is discharged from the purified water outlet 39 of the water purifier 1, a leak of raw water from the raw water reservoir 30*a* of the water purifier 1 can be easily suppressed.

The pitcher cover 32 of this example has a cover part 42 with a disc shape, a main cover 44 having a screw part 43 for allowing screw binding to a screw part (not illustrated) formed on the upper part of the main pitcher body 30, and a dial disc 45 with a disc shape which is attached in a detachable manner on the top surface of the main cover 44 and can rotate in the peripheral direction. Due to the main cover 44, the top part 31 having an opening of the main pitcher body 30 is sealed so as not to allow a leak of liquid. Specifically, by tightening the main cover 44 and in accordance with an interaction between a sealing material consisting of the O ring 46, which is provided on the bottom periphery of the screw part 43, and a sealing material consisting of the O ring 47, which is provided on the top periphery of the partition part 34, liquid in the top part 31 is sealed without having any leak. In this state, the communication hole 38 and the purified water outlet 39 are sealed by the screw part 43 and the sealing material consisting of the O ring 46 so that it is not allowed to discharge any purified water.

Furthermore, on the screw part 43 on an area corresponding to a marking part M of triangle shape, which is formed on the top surface of the pitcher cover 32, a screw thread is not provided, and by allowing the marking part M to meet the purified water outlet 39, the purified water can be discharged.

The dial disc 45 is attached in a detachable manner to the main cover 44 by fastening a ring shaped protrusion 45c of the dial disc 45 to a click part 48 which is provided in an upright manner in the main cover 44. The dial disc 45 is designed to rotate as a user places his or her finger on a finger-holding concave part 45b that is formed on the surface of the dial disc 45 and rotates the disc.

On the dial disc 45, a window part 45a which penetrates from the top surface to the rear surface of the disc is formed. Furthermore, on a position corresponding to the window part 45a in a region in which the dial disc 45 is formed in the main cover 44, numbers of from 1 to 12, which represent each month from January to December, are described in a circle shape. Accordingly, as a user suitably rotates the dial disc 45, part of the number of from 1 to 12 can be selectively displayed in the window part 45a. For example, by displaying in the window part 45a the number which represents the number of usable months considering the service life of the water filter cartridge 10, replacement of the water filter cartridge 10 can be carried out on the basis of the displayed number.

Hereinbelow, the working mechanism of the water purifier 1 will be described.

The pitcher cover 32 of the water purifier 1 is removed, and raw water is supplied to the raw water reservoir 30a inside the main pitcher body 30 of the water purifier 1. The raw water supplied to the raw water reservoir 30a is introduced, by virtue of its own weight, from the inlet 18 to the inside of the water filter cartridge 10. In addition, as the residual chlorine or mold odor, organic compounds like trihalomethane, or the like in the raw water are adsorbed by the activated carbon 16 and removed, microbes or fine particles are also filtered by the hollow fiber membrane bundle 14 and removed to have purification. The purified water is discharged from the outlet 20, and stored in the inside of the purified water reservoir 30b. During the treatment of raw water, the pitcher cover 32 is loosened so that air can be introduced from the top part 31 of the main pitcher body 30 to the raw water reservoir 30a. Accordingly, the purification treatment of raw water can be efficiently carried out.

Once the entire amount of the raw water inside the raw water reservoir 30a is treated by the water filter cartridge 10 and then stored in the purified water reservoir 30b, the pitcher cover 32 is tightened so that the top part 31 of the main pitcher body 30 is closed to have no leak of liquid. The water purifier 1 in this state can be horizontally placed in a refrigerator or the like. When the water purifier 1 is horizontally placed while having the foot part 31a and 35a face the downward, the purified water outlet 39 is present in the upward direction.

The purified water stored in the purified water reservoir 30b can be discharged from the purified water outlet 39 to a cup or the like by loosening the pitcher cover 32, having the marking part M of triangle shape to meet the purified water outlet 39, and tiling the water purifier 1 after unlocking a neck part 40a of the water purifier 1.

Since the water purifier of the present invention as described above is equipped with the water filter cartridge of the present invention which has a little fluctuation in the filtration flow rate and filtration performance caused by a change in the filling amount of activated carbon, even when the water filter cartridge is produced in a large scale, sufficient filtration flow rate and favorable filtration performance are stably obtained.

Furthermore, the water purifier of the present invention is useful in that, even in the case of having a water filter cartridge in which activated carbon is filled on the hollow fiber membrane bundle without being mediated by a partition member, a fluctuation in the filtration flow rate and filtration performance is suppressed at a low level even when part of the activated carbon falls between the hollow fiber membrane during use.

Hereinbelow, the present invention is described in detail in view of the examples, but the present invention is not limited to the following descriptions.

[Activated Carbon]

Figure 5:
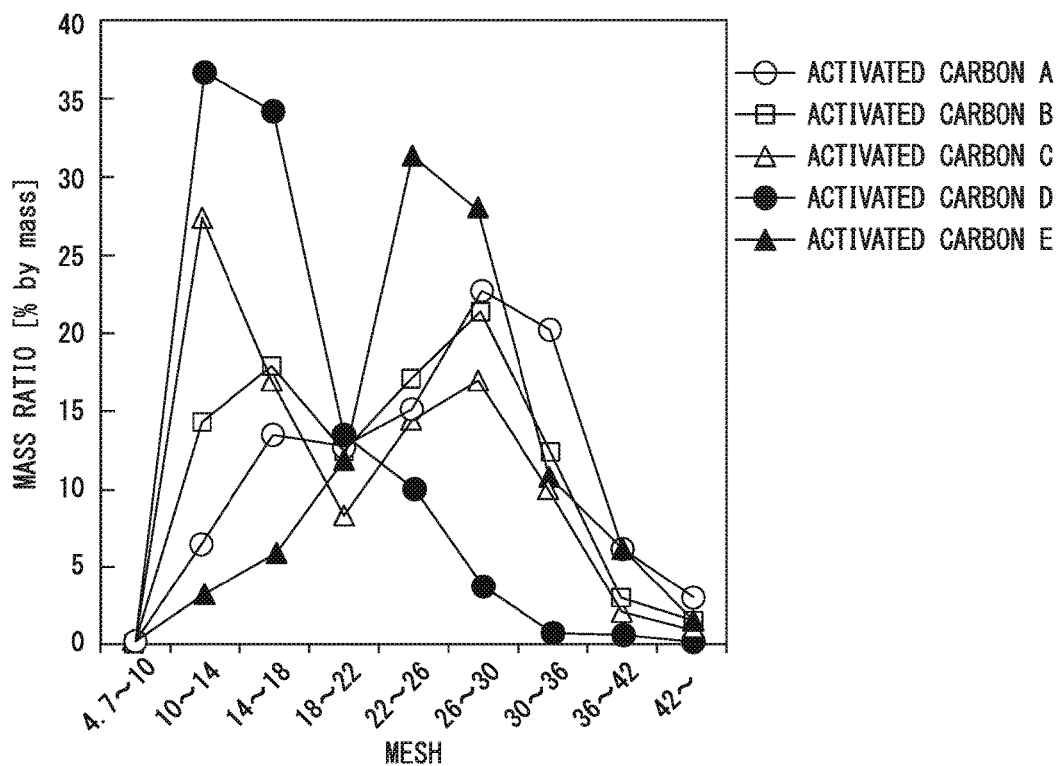
FIG. 5 is a graph illustrating the particle size distribution of activated carbons A to E that are used in Examples.

The particle size distribution of the activated carbons A to E that are used in the present Examples and Comparative Examples are shown in Table 1 and FIG. 5. In Table 1, "4.7 to 10" indicates activated carbon which passes through a sieve of 4.7 mesh but stays on the top of a sieve of 10 mesh. The same description is also applied to "10 to 14" or the like. Furthermore, the mass ratio shown in the line of "4.7 to 10" indicates the mass ratio of the activated carbon which passes through a sieve of 4.7 mesh but stays on the top of a sieve of 10 mesh relative to the total mass of the activated carbon. The same description is also applied to "10 to 14" or the like.

The activated carbons A to C were obtained by mixing KURARAY COAL GW 10/32 (manufactured by KURARAY CHEMICAL CO., LTD.) and KURARAY COAL GW 20/40 (manufactured by KURARAY CHEMICAL CO., LTD.), each in the same amount, sieving them using a sieve of 10 mesh, 14 mesh, 18 mesh, 22 mesh, 26 mesh, 30 mesh, 36 mesh, or 42 mesh, and mixing the activated carbon on top of sieve of each mesh and the activated carbon collected in a holder to have the particle size distribution shown in Table 1.

Furthermore, as for the activated carbon D, KURARAY COAL GW 10/32 was used, and as for the activated carbon E, KURARAY COAL GW 20/40 was used.

TABLE 1

|  | Mesh | Activated carbon A | Activated carbon B | Activated carbon C | Activated carbon D | Activated carbon E |
|---|---|---|---|---|---|---|
| Particle size distribution (mass ratio) [% by mass] | 4.7 to 10 | 0 | 0.1 | 0.5 | 0.3 | 0.3 |
|  | 10 to 14 | 6.5 | 14.3 | 27.7 | 36.6 | 3.3 |
|  | 14 to 18 | 13.6 | 17.8 | 17.2 | 34.3 | 6.1 |
|  | 18 to 22 | 12.5 | 12.3 | 8.5 | 13.3 | 12.3 |
|  | 22 to 26 | 15.1 | 17.1 | 14.5 | 10 | 31.4 |
|  | 26 to 30 | 22.8 | 21.4 | 17.1 | 3.8 | 27.7 |
|  | 30 to 36 | 20.3 | 12.4 | 10.0 | 0.8 | 10.9 |
|  | 36 to 42 | 6.2 | 3.1 | 2.4 | 0.6 | 6.5 |
|  | 42 and up | 3.0 | 1.5 | 1.1 | 0.3 | 1.5 |
| Total mass of particulate activated carbon with particle size of 4.7 to 42 mesh (0.355 to 4.0 mm)/ Total mass of activated carbon [% by mass] |  | 97.0 | 98.5 | 97.9 | 99.7 | 98.5 |

EXAMPLE 1 (FILTRATION PERFORMANCE TEST)

Example 1

Based on an example of the embodiments of the present invention which is illustrated in FIG. 1, the activated carbon A was filled on a polysulfone hollow fiber membrane which has outer diameter of 600 μm and membrane thickness 100 μm, and is capable of removing 90% or more of the particles with a size of 0.2 μm, and then a water filter cartridge in which the filling density of the hollow fiber membrane and the filling amount of the activated carbon A are modified to have desired space velocity was produced.

Figure 6:
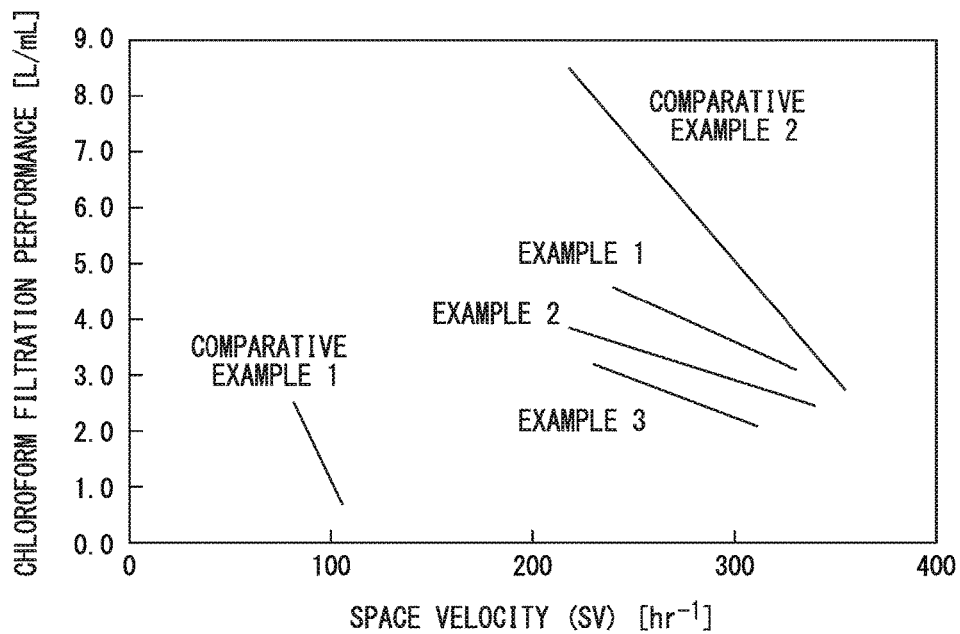
FIG. 6 is a graph illustrating the relationship of chloroform filtration performance relative to space velocity of pass-through water used in EXAMPLE 1.

Based on the batch type of JIS S3201, water containing chloroform at concentration of 60 ppb was allowed to flow while changing the space velocity, and by having the point at which 80% of the chloroform is removed as a break point, the chloroform filtration performance was evaluated as a filtration performance. The results are shown in FIG. 6.

Example 2

The same water filter cartridge as Example 1 was produced, except that the activated carbon B was used instead of the activated carbon A, and the same test as Example 1 was carried out. The results are shown in FIG. 6.

Example 3

The same water filter cartridge as Example 1 was produced, except that the activated carbon C was used instead of the activated carbon A, and the same test as Example 1 was carried out. The results are shown in FIG. 6.

Comparative Example 1

The same water filter cartridge as Example 1 was produced, except that the activated carbon D was used instead of the activated carbon A, and the same test as Example 1 was carried out. The results are shown in FIG. 6.

Comparative Example 2

The same water filter cartridge as Example 1 was produced, except that the activated carbon E was used instead of the activated carbon A, and the same test as Example 1 was carried out. The results are shown in FIG. 6.

The mathematical formulae representing the straight lines ($y=ax+b$) of each of Examples 1 to 3 and Comparative Examples 1 and 2 shown in FIG. 6 are as described below. In those mathematical formulae, the chloroform filtration performance [L/mL] is exhibited against the y axis as a longitudinal axis and the space velocity (SV) [$hr^{-1}$] is exhibited against the x axis as a horizontal axis.

Example 1: $y=-0.0178x+8.8889$,
Example 2: $y=-0.0111x+6.2778$,
Example 3: $y=-0.015x+6.6$,
Comparative Example 1: $y=-0.0708x+8.2936$,
Comparative Example 2: $y=-0.0407x+17.258$.

In the case of using the activated carbon with particle size distribution of the activated carbons A to C, the amount of the decrease in the chloroform filtration performance relative to the increase in the space velocity of pass-through water was small and the filtration performance was stabilized when compared to a case in which the activated carbon with particle size distribution of the activated carbon D or E, that is, activated carbon which has a peak at which the mass ratio is 31% by mass or more in a particle size range of from 0.3 to 4.0 mm, is used. Based on this result, it is believed that, even when the space velocity of pass-through water is changed due to the falling of activated carbon between the hollow fiber membranes or a fluctuation caused by crushed carbon, the influence on the filtration performance is small with the activated carbons A to C.

EXAMPLE 2 (FILTRATION FLOW RATE TEST)

Example 4

Figure 7:
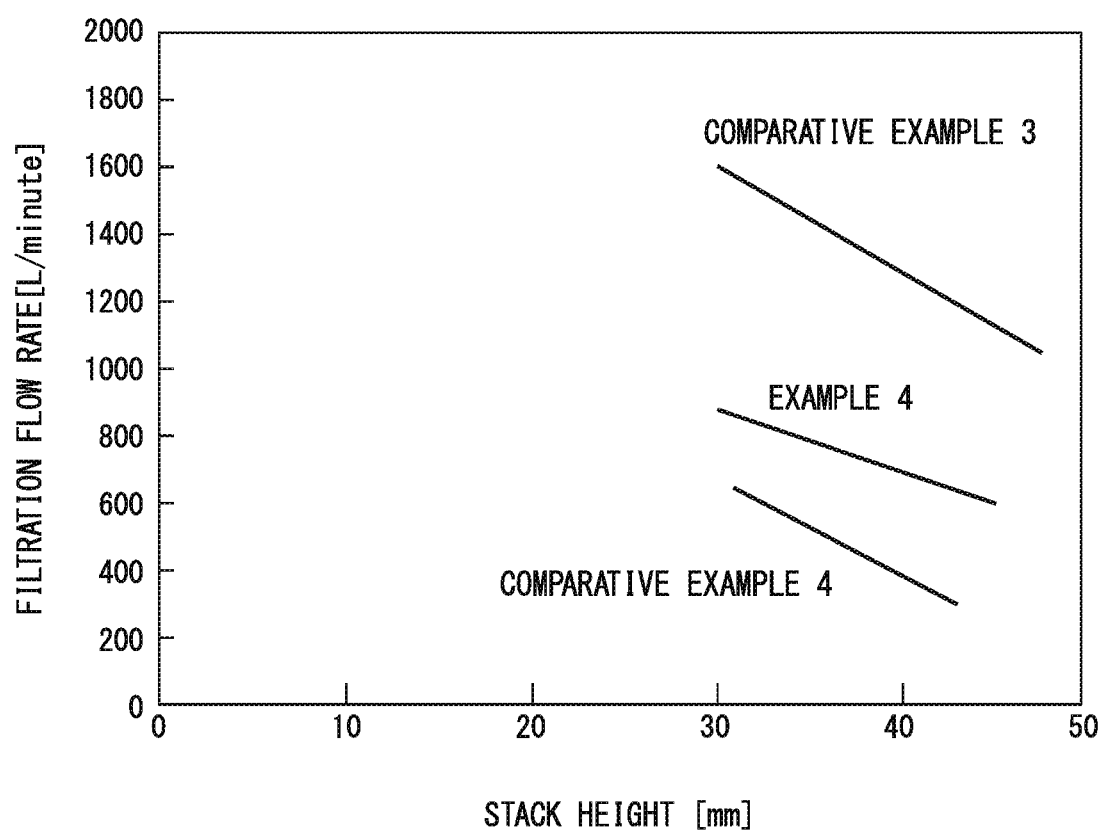
FIG. 7 is a graph illustrating the relationship of the filtration flow rate relative to stack height of activated carbon in EXAMPLE 2.

Based on an example of the embodiments of the present invention which is shown in FIG. 1, the case 12 was produced as a transparent member, and without adding the hollow fiber membrane bundle 14, a mesh material was added to the bottom part and the activated carbon B was filled to have a predetermined stack height. Based on the batch type of JIS S3201, the filtration flow rate was measured. The results showing the filtration flow rate relative to the stack height of activated carbon are illustrated in FIG. 7.

Comparative Example 3

The same water filter cartridge as Example 4 was produced, except that the activated carbon D was used instead of the activated carbon B, and the same test as Example 4 was carried out. The results are shown in FIG. 7.

Comparative Example 4

The same water filter cartridge as Example 4 was produced, except that the activated carbon E was used instead of the activated carbon B, and the same test as Example 4 was carried out. The results are shown in FIG. 7.

The mathematical formulae representing the straight lines (y=cx+d) of each of Example 4 and Comparative Examples 3 and 4 shown in FIG. 7 are as described below. In those mathematical formulae, the filtration flow rate [L/minute] is exhibited against the y axis as a longitudinal axis and the stack height [mm] is exhibited against the x axis as a horizontal axis.

Example 4: y=−18.317x+1422.5,
Comparative Example 3: y=−31.2x+2526,
Comparative Example 4: y=−28.75x+1534.8.

In the case of using the activated carbon with particle size distribution of the activated carbon B, the amount of the decrease in the filtration flow rate relative to the stack height of the activate carbon was small when compared to a case in which the activated carbon with particle size distribution of the activated carbon D or E, that is, activated carbon which has a peak at which the mass ratio is 31% by mass or more in a particle size range of from 0.3 to 4.0 mm, is used. Based on this result, it is believed that, even when the activated carbon is incorporated between the hollow fiber membranes or the stack height is changed due to a fluctuation caused by crushed carbon, the influence on the filtration performance is small with the activated carbon B.

EXPLANATIONS OF LETTERS OR NUMERALS

1 Water purifier
10 Water filter cartridge
12 Case
14 Hollow fiber membrane bundle
16 Activated carbon

The invention claimed is:

1. A water filter cartridge having particulate activated carbon filled in a case for accommodating a filtering material in which the ratio of the total mass of particulate activated carbon having a particle size of 0.3 to 4.0 mm relative to the total mass of activated carbon is 97% by mass or more, and, in a particle size distribution which represents the relationship of the mass ratio of activated carbon relative to the particle size of activated carbon, a peak at which the mass ratio is 31% by mass or more does not appear in a particle size range of from 0.3 to 4.0 mm.

2. The water filter cartridge according to claim 1, wherein the activated carbon is activated carbon which has at least one peak in each of a region with particle diameter of 0.3 mm or more and less than 0.71 mm and a region with particle diameter of 0.71 mm or more and 4.0 mm or less in the particle size distribution.

3. The water filter cartridge according to claim 2, wherein the activated carbon is activated carbon which has one peak in each of a region with particle diameter of 0.3 mm or more and less than 0.71 mm and a region with particle diameter of 0.71 mm or more and 4.0 mm or less in the particle size distribution.

4. The water filter cartridge according to claim 1, being a water filter cartridge for gravity filtration.

5. The water filter cartridge according to claim 1, wherein a hollow fiber membrane bundle is further filled as a filtering material and the activated carbon is filled on top of the hollow fiber membrane bundle.

6. The water filter cartridge according to claim 5, wherein the activated carbon is filled on top of the hollow fiber membrane bundle without being mediated by a partition member.

7. The water filter cartridge according to claim 6, wherein, when the activated carbon is filled on top of the hollow fiber membrane and water containing chloroform at concentration of 60 ppb is allowed to flow so as to have predetermined space velocity (SV) [$hr^{-1}$] based on JIS S3201, and then chloroform filtration performance [L/mL] is measured by having the point of 80% chloroform removal as a break point, the space velocity (SV) is plotted against x axis and the chloroform filtration performance is plotted against y axis, and linear approximation is made (y =ax +b), slope a of the straight line is −0.03 to 0.

8. The water filter cartridge according to claim 7, wherein, when the activated carbon is filled to a predetermined stack height and filtration flow rate is measured based on JIS S3201, and then the stack height [mm] of the activated carbon is plotted against x axis and the filtration flow rate [L/minute] is plotted against y axis, and linear approximation is made (y =cx +d), slope c of the straight line is −25 to 0.

9. A water purifier equipped with the water filter cartridge according to claim 1.

* * * * *